US006947505B2

(12) United States Patent
Learned

(10) Patent No.: US 6,947,505 B2
(45) Date of Patent: Sep. 20, 2005

(54) SYSTEM FOR PARAMETER ESTIMATION AND TRACKING OF INTERFERING DIGITALLY MODULATED SIGNALS

(75) Inventor: Rachel E. Learned, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 798 days.

(21) Appl. No.: 09/943,770

(22) Filed: Aug. 31, 2001

(65) Prior Publication Data
US 2002/0037061 A1 Mar. 28, 2002

Related U.S. Application Data
(60) Provisional application No. 60/233,870, filed on Sep. 20, 2000.

(51) Int. Cl.[7] .................................................. H03D 1/04
(52) U.S. Cl. ..................... 375/346; 375/149; 375/316; 375/340
(58) Field of Search ................................ 375/149, 340, 375/346

(56) References Cited

U.S. PATENT DOCUMENTS

| 5,710,797 | A | * | 1/1998 | Segal et al. ................. 375/346 |
| 5,719,899 | A | | 2/1998 | Thielecke et al. |
| 5,790,606 | A | | 8/1998 | Dent |
| 5,933,768 | A | | 8/1999 | Skold et al. |
| 5,982,813 | A | | 11/1999 | Dutta |
| 6,026,130 | A | * | 2/2000 | Rahmatullah et al. ...... 375/340 |
| 6,122,269 | A | | 9/2000 | Wales |
| 6,198,775 | B1 | | 3/2001 | Khayrallah |
| 6,219,341 | B1 | | 4/2001 | Varanasi |
| 6,404,760 | B1 | | 6/2002 | Holtzman et al. |
| 6,483,866 | B1 | * | 11/2002 | Suzuki ....................... 375/149 |
| 2001/0026599 | A1 | * | 10/2001 | Hoffmann et al. .......... 375/343 |

OTHER PUBLICATIONS

PCT International Search Report dated Feb. 28, 2003 of International Application No. PCT/US02/27451 filed Aug. 29, 2002.

Xiaodong Wang and H. Vincent Poor, "Iterative (Turbo) Soft Interference Cancellation and Decoding for Coded CDMA," IEEE Transactions on Communications, vol. 47, No. 7 Jul. 1999.

S. Verdu, Multi–User Detection, Cambridge University Press, 1998.

* cited by examiner

Primary Examiner—Stephen Chin
Assistant Examiner—Erin M. File
(74) Attorney, Agent, or Firm—Daniel J. Long; Robert K. Tendler

(57) ABSTRACT

In a multi-user detection system in which interfering signals are purposely allowed to exist, a parameter estimation unit is provided which utilizes signal processing for determining the channel transfer function for each received signal, including the received power, phase of the oscillator, timing offset relative to the base station clock carrier frequency offset, and number of multipaths replicas and delays for each replica, with the system providing realtime uninterrupted estimates of these parameters required by the signal separation unit.

9 Claims, 4 Drawing Sheets

SYSTEM FOR PARAMETER ESTIMATION AND TRACKING OF INTERFERING DIGITALLY MODULATED SIGNALS

This application claims benefit of application Ser. No. 60/233,870 filed Sep. 20, 2000.

FIELD OF INVENTION

This invention relates to telecommunication and more particularly to a method and apparatus for separating interfering signals utilizing improved parameter estimation techniques.

BACKGROUND OF THE INVENTION

As described in co-pending provisional patent application Ser. No. 60/233,870 filed on Sep. 20, 2000 by Rachel Learned and Joseph Su, and incorporated herein by reference, a system is provided for separating interfering signals which utilizes a parameter estimation unit. The purpose of the parameter estimation unit is to be able to derive channel parameters which uniquely distinguish the characteristics of each individual signal regardless of the fact that the signals exist in the same communications bandwidth and at the same instant in time. These parameters are required by any signal separation system for highly loaded or overloaded systems of users and in general include for each signal the channel transfer function comprised of the received power, the phase of the oscillator which generated each received signal, the timing offset relative to the base station clock, any frequency offset of the carrier, and the structure of the multipath replicas.

In reality, however, the received power of the signals vary substantially from burst to burst, which means that the parameter estimation becomes somewhat difficult. Likewise, the phase of the oscillator can also vary from burst to burst, as can the timing offset which is the variance of when the signals are to be received in a particular timing slot of the communications system. Not only can all of these parameters change on a burst by burst basis, the frequency of the carrier can also change, most notably due to Doppler shifts.

The result is that signal separation becomes increasingly difficult in the changing environment where a number of mobile users are trying to communicate with a base station on the same channel.

While the parameter estimation method described in the aforementioned patent application is useful in signal separation, one of its features is that it requires a serial approach to generation of parameter estimation values which overlooks the dynamic nature of the communications environment. In reality, while such a system is able to extract the various parameters of the simultaneously-occurring signals in a quite robust fashion, there remains nonetheless certain times when due to the serial nature of the calculation, there are blanks or blackout periods at which time some of the simultaneously-occurring signals are being ignored or are not being tracked.

For multi-user detection systems, there is therefore a need to be able to dynamically adapt to the changing signals occasioned by the fact that the mobile users are in fact mobile and to the fact that the power adjustment for each of the mobile terminals is adjusted by the base station, sometimes on a burst by burst basis. It will be appreciated that in many multi-user configurations such as with air interfaces including GSM, other TDMA systems and CDMA systems, power level adjustments are made as often as 800 times a second. The result is that a parameter estimation at one particular point in time is invalid if for no other reason than the power level is changed at the handset. While this is done in an organized and routine manner, when considering overlapping or interfering signals the change in power to say nothing of the other parameters, results in an inability to separate interfering signals on the same channel.

SUMMARY OF THE INVENTION

In order to be able to accommodate multiple interfering signals on the same communication channel in which the signals are purposely allowed to interfere with one another to be able to make maximum utilization of a traffic channel, in the subject invention, initial estimates are made of various parameters utilizing the interference-free received signal on the acquisition channel and the usual traffic channel training sequences which are transmitted to identify each mobile user and to set up timing for the burst transmission from the mobile phone. Thereafter, when a first user or corner exists and is assigned a particular traffic channel, initial parameter values from the acquisition channel are utilized in the tracking of the channel transfer function, including power, multipath structure, timing offset and frequency of this first corner or first signal in the traffic channel.

Thereafter, when a second interfering signal exists on the traffic channel, the system recreates the training sequence portion of every signal on the traffic channel prior to the last signal entering, and subtracts this from the training signal portion of the received signal to provide an interference-free signal from which to calculate estimates of the parameters for a newcomer to the channel. The above utilizes the training signal portions of the received signals. What this does in essence is to single out the signal of the newcomer.

Having estimates of the various parameters of the newcomer to the channel and assuming that there are two or more interfering signals on the channel, parallel processing is then utilized to isolate each of the signals assigned to the same channel by utilizing the previously described method of recreating then subtracting training sequence portions of the signals. A slightly modified version of the parallel processing portion which utalizes cascaded processing steps is also offered in the event parallel processing is not desirable.

The result is that the system can simultaneously track all of the interfering signals in realtime by providing ultra-fast parameter estimation, with these estimated values utilized by the signal separation algorithm.

In operation, it will be appreciated that various procedures in the open literature and in use today may be used to perform the parameter estimation on the interference-free signal created by this process. One method for calculating high quality estimates of the parameters for each active signal in the traffic channel is to note that if a signal sits in the traffic channel for any given period of time and estimations of the parameters are ongoing, a sliding window weighted average of all previously calculated parameters will produce high quality estimates. What this means is that as each burst arrives and the parameter estimation is done on each burst individually, it is now possible to throw out the parameter estimations associated with prior bursts back farther than some predetermined number, and derive an improved estimate by averaging the parameters from proceeding recent bursts. This is in essence equivalent to a sliding window average in which one can weight the more recent estimates more heavily than those in the past.

The result is that while the system can estimate parameters on a burst by burst basis, more robust parameter estimation can be achieved through intelligent averaging.

What is therefore accomplished is the ability to permit signal separation in an environment in which multiple signals interfere with one another and the signals are dynamically changing without suffering blank periods or interruption in the parameter estimation process. Blank periods or incorrect values of parameters would lead to the inability to separate signals for any signal separation or multiuser detection system for recovering each of the interfering users' information bit sequences.

What has been described is the utilization of the acquisition channel and the training sequences which are normally utilized to initialize the handsets and to track timing. There are, of course, many techniques for isolating training sequences, such as zeroing out the signal to either side of the training sequence. This can be done through windowing techniques or by digital signal processing in which actual values corresponding to signals outside the training sequence are replaced by zeros.

The training sequence as used herein refers to any apriori known bit or symbol sequence which is utilized to obtain estimates of the various parameters associated with each of the co-channel transmitted signals. They can be for instance a pilot tone, a particular bit stream or can even be a recovered estimated bit stream which can be assumed to be perfectly known.

As in the case of GSM transmission, the training sequence is utilized to identify each mobile user and to acquire timing offsets so that the base station can send control signals to tell the mobile unit to alter its timing. It will be appreciated that these training signals exist already. Since they exist, the subject system can make use of these training signals to permit rapid parameter estimation.

Thus, for instance in GSM, and other wireless multiple access communication systems, training signals are regularly utilized. It is for this reason that any digital communication system can make use of the subject parameter estimation system so that interfering signals can be separated.

In summary, in a multi-user detection system in which interfering signals are purposely allowed to exist, a parameter estimation unit is provided which utilizes parallel processing for determining the channel for each received signal, which, in essence provides for each signal the received power, multipath structure, phase of the oscillator, timing offset relative to the base station clock and carrier frequency offset, with the system providing realtime uninterrupted estimates of these parameters required by the signal separation unit. In one embodiment, the estimated parameters are obtained through first providing estimated power, multipath structure, timing and frequency offset for signals on the acquisition channel. When a user communicates with the base station over the acquisition channel, the base station assigns it a traffic channel. Prior to the signal switching over the traffic channel, the base station estimates power, timing offset and frequency offset. These initial values from the acquisition channel are passed to the tracking unit for the traffic channel. Additionally, for each signal in the traffic channel, phase is also tracked without utilization of the initial set of estimates from the acquisition channel since current systems do not require phase coherent transitioning from the acquisition channel to the traffic channel and therefore would render any phase estimates done in the acquisition channel useless. Of course, if some level of coherence exists between the carrier oscillator phase in the received signal over the acquisition channel and the first instance of the received signal over the traffic channel, then an initial phase estimate can be done in the acquisition channel and passed with all other estimates to the traffic channel parameter tracking unit. When a second signal is detected at the base station and is assigned to the same traffic channel, then the parameter estimation unit recreates the training sequence signal portion of every signal on the traffic channel prior to the last signal entering and subtracts this from the training portion of the received signal which is an aggregate of all the prior signals so as to provide an estimate of the signal solely due to the newcomer to the channel during the training signal portion. This singles out the newcomer and therefore allows for a clean signal from which to estimate parameters of the newcomer. after a short period of time the parameters will be of high quality with respect to the newcomer. Thereafter the system simultaneously tracks all signals in the traffic channel. In one embodiment, this is accomplished by a parallel recreation of the training signal portions of the traffic channel signals so as to isolate only one user's signal at a time. With five co-channel signals there will be, in one embodiment, five parallel processing blocks each isolating a different signal within the channel.

BRIEF DESCRIPTION OF THE DRAWINGS

These and other features of the subject invention will be better understood in connection with the Detail Description in conjunction with the Drawings of which.

DETAILED DESCRIPTION

Figure 1:
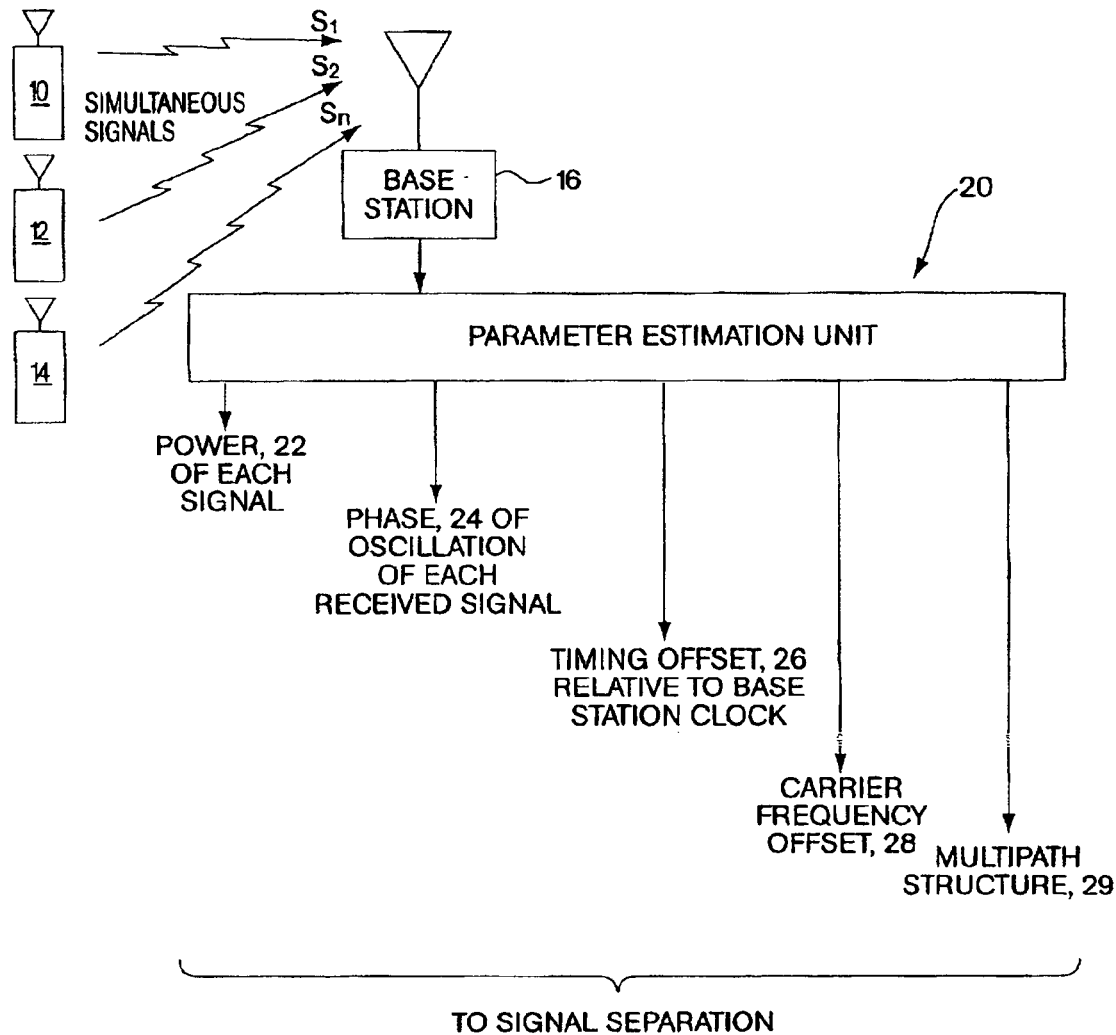
FIG. 1 is a diagrammatic representation of the utilization of parameter estimation in the signal separation process in which the parameter estimation provides parameter values respectively for received power, phase, timing offset and carrier frequency offset.

Referring now to FIG. 1, as will be seen, a number of wireless transceivers 10, 12 and 14 communicate with a base station 16 in which the signals from the wireless transceivers 10, 12 and 14 simultaneously exist on the same traffic channel.

It is the purpose of the subject system to permit the separation of these signals which coexist and to do so with a parameter estimation system which provides for realtime signal separation by providing rapidly generated parameters to the signal separation unit.

It will be appreciated that in most digital wireless communication systems a training sequence is transmitted as part of each burst of data for the purpose of enabling the receiver to determine and adjust the timing and other parameters which permit the wireless transceivers to communicate with the base station and visa versa.

In the GSM system, for example, the training sequences are transmitted in the middle of a burst, either traffic, control, signal, etc, so as to provide for appropriate transmissions from the wireless units. The purpose of the training signal is so that each transmitter can be identified relative to the others and so that their transmissions or bursts can be placed in the appropriate time slot for demodulation at the base station, as well as to sort the received data streams for data routing after demodulation and recovery of the bit streams.

The problem with such a system occurs when each of the wireless transmitters transmits on the same channel at the same frequency and at the same time. What this means is that simultaneous signals are arriving at the base station 16, and must be separated in order to be intelligible. Such systems are called overloaded multiple access systems and require for signal separation certain parameters of each of the signals which distinguish them. Presently, overloaded systems are not among those in operation due to the lack of reliable robust signal separation devices, partly due to the lack of a reliable robust parameter estimation device able to estimate and track signal parameters when the signals are interfering with one another.

As illustrated at 20, a parameter estimation unit is to provide the channel transfer function for each of the interfering users at its output. In the remainder of this description, the parameters that will be required for signal separation are delineated and specified in place of the more general notion of the channel transfer function, although knowing the channel transfer function is equivalent to knowing these parameters. Specifically the parameter estimation unit 20 provides at its output for each interfering user the received power 22, the phase 24 of the oscillator for each of the transmitted signals, the timing offset 26 relative to the base station clock and transmission distance, the carrier frequency offset 28 and the multipath structure 29. Each of the signals in the particular traffic channel here labeled $S_1, S_2, S_3 \ldots S_n$ are identified in realtime as to their various parameters. These parameters, when identified, are utilized in the signal separation process such as described in the aforementioned patent application, assigned to the assignee hereof.

As mentioned hereinbefore, multi-path and Doppler shifts caused by the movement of the wireless transmitter and due to the constantly changing power levels associated with the basic transmission itself, require that the parameter estimation unit track all of these changes so that the values outputted by the parameter estimation unit reflect what is happening in a real world scenario and do so in realtime. Thus the parameter estimation system must be able to operate in a robust realtime manner so that neither blanks nor lack of accurate parameters values exist.

Figure 2:
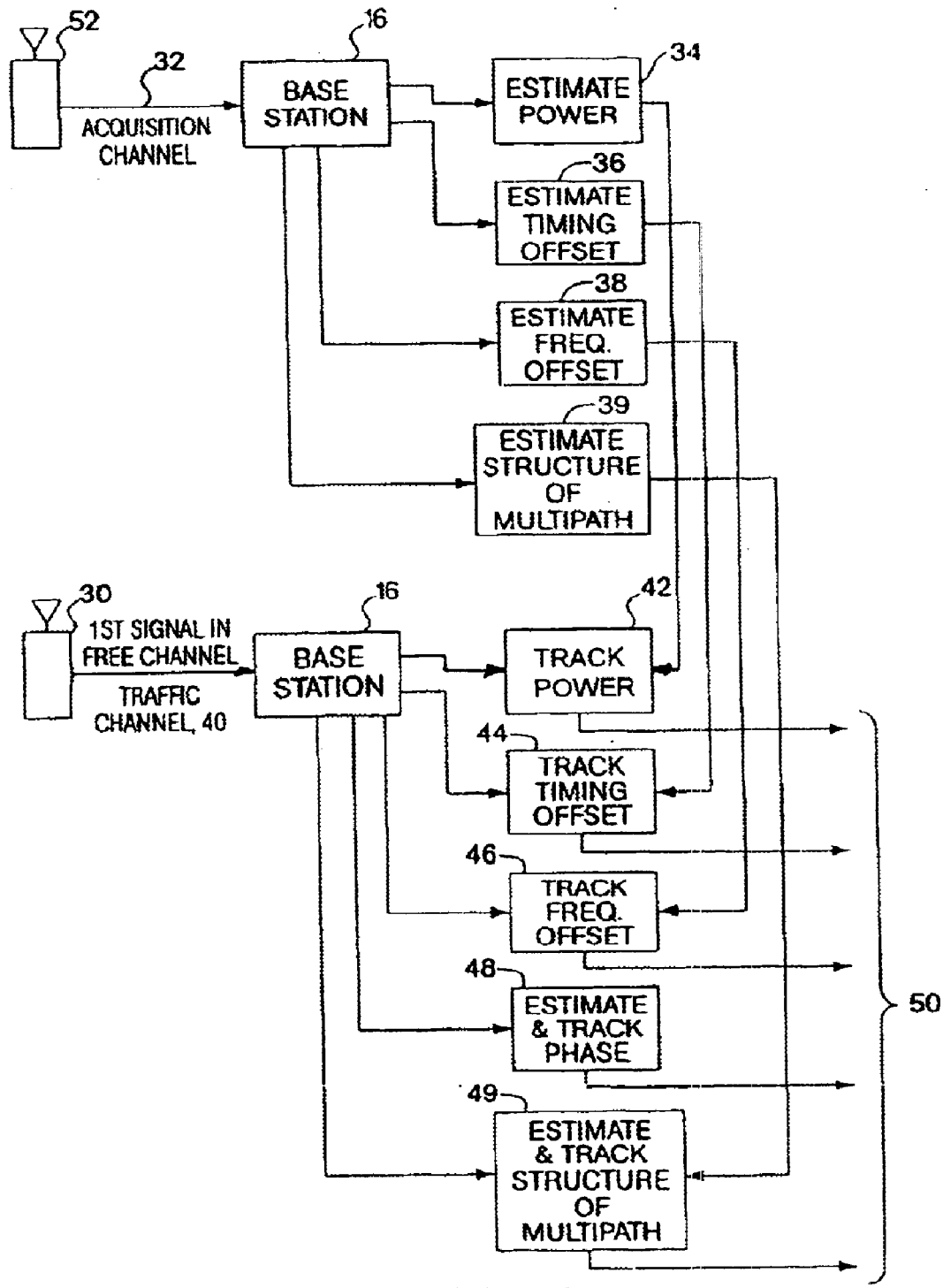
FIG. 2 is a block diagram illustrating the first step in the generation of parameter estimation values through the utilization of signals in the acquisition channel and then from the first signal in the corresponding traffic channel.

Referring now to FIG. 2, in one embodiment, signals in the acquisition channel are utilized first to provide an initial set of estimated power, timing offset and frequency offset values.

Taking for instance a wireless transceiver 30, it communicates over acquisition channel 32 to base station 16 which through techniques that are known, provides an initial set of estimates of estimated power 34, timing offset 36, frequency offset 38, and multipath structure 39 for the first wireless user which seeks to communicate with the base station.

It is the purpose of the initial estimation process to be able to track the first corner or first signal in a traffic channel which is assigned by the base station 16.

After communicating over acquisition channel 32, wireless transceiver 30 is assigned to a particular traffic channel, here illustrated at 40. Then the first signal which exists in this traffic channel and received by base station 16 has its power, timing offset, carrier frequency offset, and multipath structure tracked utilizing the initial values which were generated by analysis of the signal in the acquisition channel. Here the initial values are applied to a power tracking algorithm 42, a timing offset tracking algorithm 44, a frequency tracking algorithm 46, and a multipath structure tracking algorithm 49 the outputs of which are parameters corresponding to the tracking of this particular signal.

Also included is a unit 48, which estimates and tracks the relative phase of the first signal of the traffic channel 40. Note that power tracking, timing offset tracking, phase tracking and multipath structure tracking may be done conventionally as described in "Spread Spectrum Communications Handbook", Simon, Omura, Scholtz and Lebatt, McGraw Hill, Inc. 1994, or in any other manner described in the open literature including methods of estimating and/or tracking the entire channel transfer function from a known transmitted signal where the separate estimation of the power, timing offset, phase, frequency offset, and multipath structure is not necessary. The outputs, here designated 50, correspond to the parameter values for the first signal in the channel.

Figure 3:
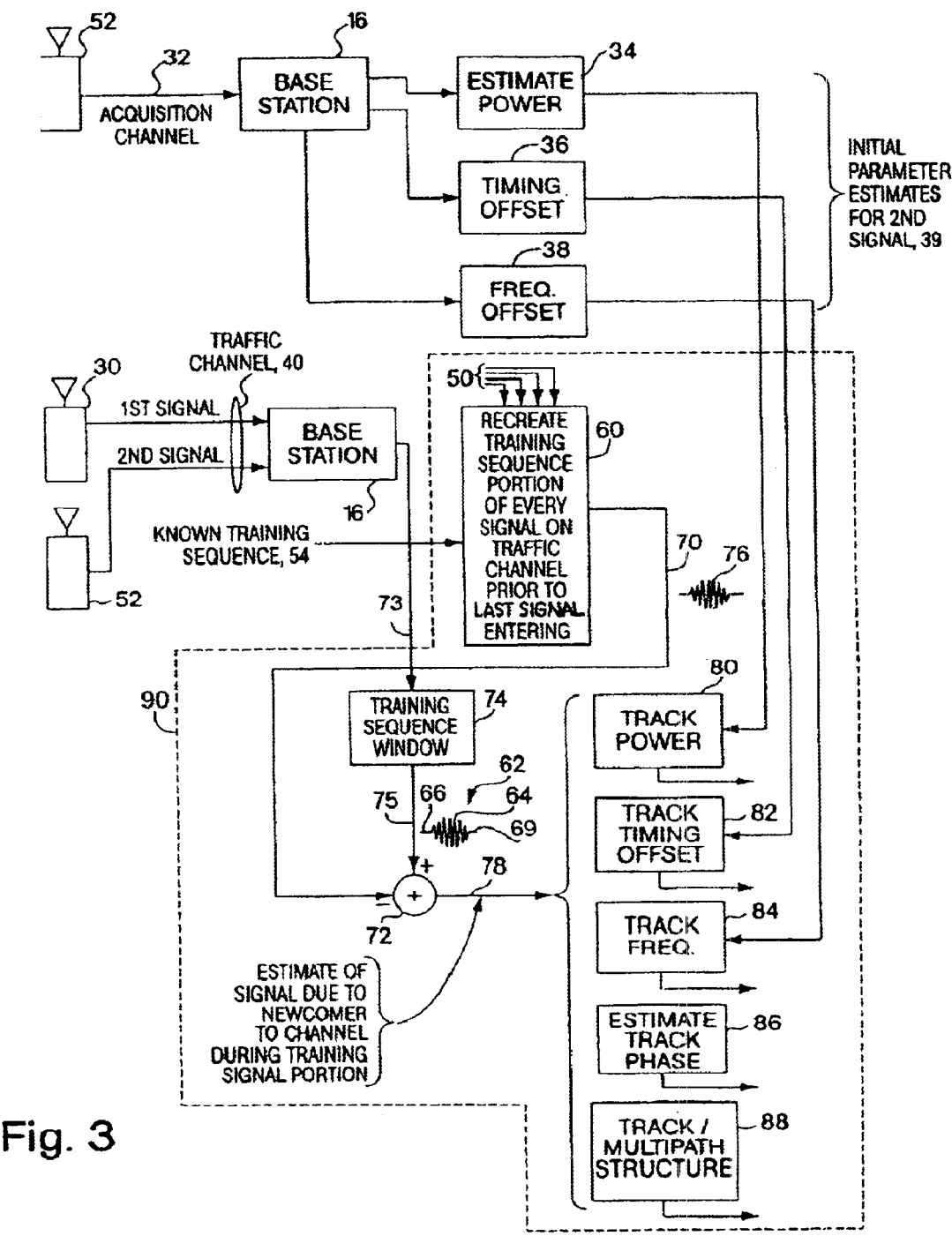
FIG. 3 is a block diagram of the operation of the subject system in which a second interfering signal is assigned to the same traffic channel, in which the subject system utilizes the recreation of the training sequence portion of every signal on the traffic channel prior to the last signal entering and subtracts this from the training sequences; and, FIG. 4 is a block diagram of a parallel tracking scheme for more than one interfering signal in a steady state where no users have dropped in or out of a channel.

Referring now to FIG. 3, the use of a training signal is described. A wireless transmitter 30 now communicates with the base station 16 over traffic channel 40. Current estimates of power, timing offset, frequency offset, phase, and multipath structure corresponding to the received signal due to transmitter 30 are tracked and are available over line 50. A second corner or wireless transmitter 52 simultaneously communicates with base station 16. Note that initial parameter estimates have been calculated at 39. It is assumed that in all cases known training sequences have been assigned to the two wireless transceivers. These training sequences are stored as illustrated at 54 as a training protocol in base station 16. Then from these training sequences and the analysis thereof, one can isolate the second signal in order to provide its particular parameter estimates.

How this is done is as follows: The signals from the first corner 30 and the second corner 52 simultaneously exist on channel 40 at base station 16. Both wireless transceivers 30 and 52 simultaneously transmit training sequences back to base station 16 during a portion of each burst. As illustrated at 60, a unit is provided which recreates the training sequence portions of every signal on the traffic channel prior to the last signal entering the traffic channel, using the most recent parameter estimates 50. In the figure, the signal already on the channel is due to transmitter 30. Hence this signal will be recreated by unit 60. The newcomer signal is due to transmitter 52 for which no high quality parameter estimates yet exist. Hence the signal due to transmitter 52 is not recreated in unit 60.

Unit 60 outputs over 70 the recreated training sequence portion of the received signal 76 that exists due to all signals utilizing the traffic channel 40 prior to the newcomer. If there were more than one transmitter already assigned to the channel 40 prior to the newcomer 52, then the signal due to each of those established users would be recreated and added together to create an estimate of what would have been received if only those established users were transmitting on channel 40 in the absence of the newcomer 52. Unit 60 has knowledge of the timing offsets of all established users and uses this to ensure that the signal sent out over line 70 is perfectly aligned with the measured signals discussed below.

The signal received and measured at the base station 16 which consists of the aggregate of each of the established signals plus the signal due to the newcomer assigned to the same traffic channel 40 is passed over line 73 to windowing unit 74. The function of windowing unit 74 is illustrated diagrammatically at 62 in which the received signal coinciding with the training sequence 64 is allowed to exist, whereas the received signal to either side of the training sequence is nulled or zeroed out, in one embodiment by simply replacing the measured digital values with zeroes for sample points that fall outside the time block known to contain a training sequence. Note that the output of windowing unit 74 is applied to a summing junction 72 as illustrated over unit 75.

The recreated time aligned output signal from unit 60, also having a zeroed out portion corresponding to where data, e.g. unkown bits, would be is delivered over line 70 to summing junction 72. It is the purpose of this summing junction to be able to recreate training sequence portion of every signal communicating on channel 40 prior to the last signal entering from the training sequence portion of the received signal and subtract it away from the received signal that includes all of those estimated plus the signal due to the newcomer. The output 78 of the summing junction is an estimate of the received signal due only to the newcomer to the channel during the training signal portion. This singles out an interference-free signal for the newcomer such that tracking of power at 80, timing offset at 82, frequency offset at 84, carrier phase at 86 and other parameters such as multipath structure 88 can be done in the manner described above for the first signal on the traffic channel.

Figure 4:
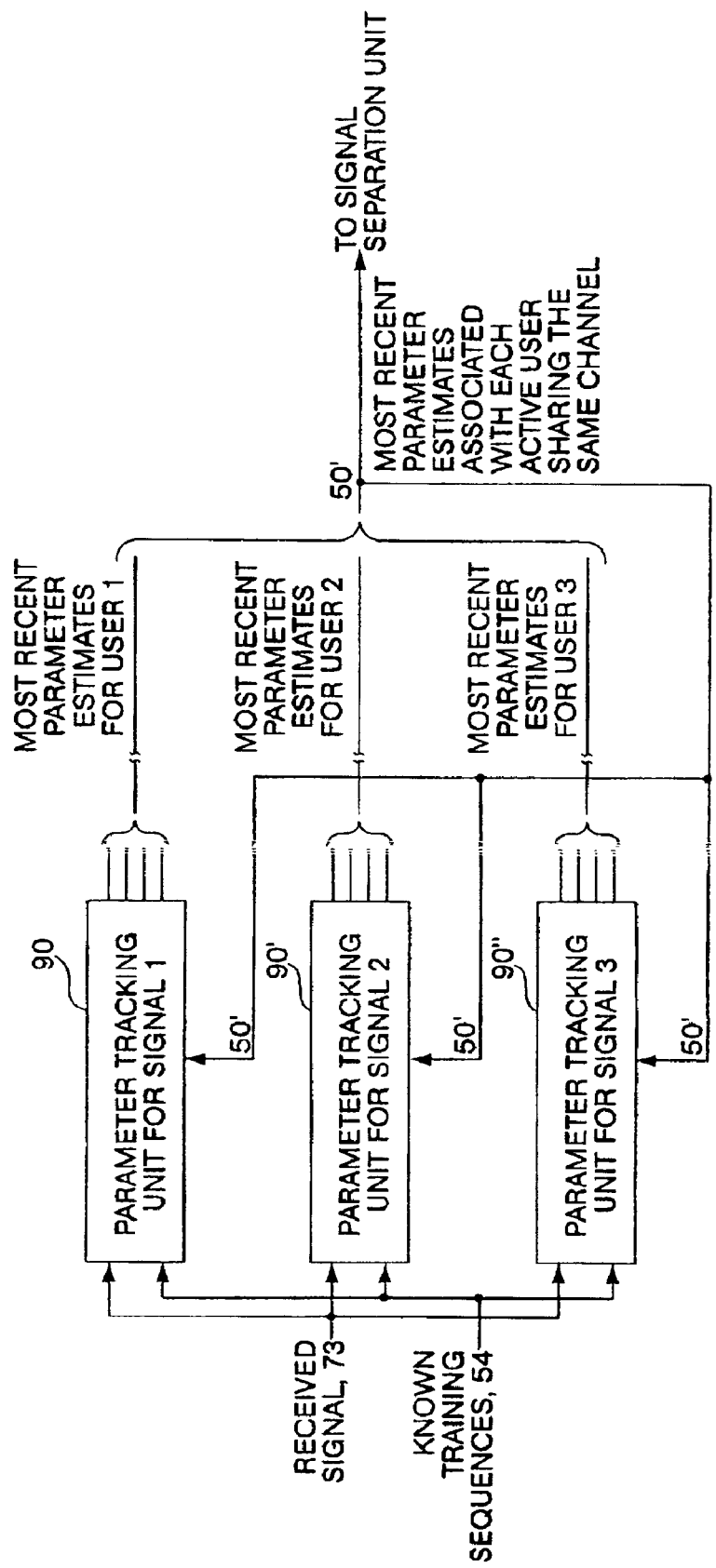

After a short period of time, the parameters associated with the newest signal to utilize the traffic channel will have been estimated with high accuracy. Once the newcomer's parameters have been estimated to a satisfactory level of accuracy, this newcomer is considered to be established on the channel. Between the time the most recent newcomer has been established and when the next newcomer arrives, parameters for all established users are tracked. As shown in FIG. 4, in the subject system parallel processing techniques are utilized such that each signal sharing the same traffic channel is isolated and the parameter tracking process is continued. This is done in parallel where one processing unit can be assigned to focus on each signal by recreating the training sequence portion of every signal in the traffic channel except the one of interest to that particular processing unit.

Referring now to FIG. 4, in order to accommodate a parallel tracking of the interfering signals, assuming that the training sequences are known for these signals and one has initial estimates of all of the signal parameters such as of course, power, frequency offset, timing offset, and multipath structure, then these parameters can be updated by recalculating parameters associated with the first signal by using the information available from the second and third signals. The reason for the updating is that the parameters change in time.

What will be first described is the serial updating scheme in which the parameter tracking unit of FIG. 3, which include all of the elements and dotted box 90, are duplicated as 90, 90' and 90".

In operation, assuming one wishes to update the parameters for the first signal, then the outputs of parameter tracking unit 90' and parameter tracking unit 90" are fed back to parameter tracking unit 90 so as to be able to recreate Signal 2 and Signal 3 and then strip them away from the received signal. As described above for the parameter estimation of the newcomer, tracking unit 90 temporarily treats Signal 1 as if it is the newcomer to create an estimate of the received signal that would have been due to the transmission of Transmitter 1. Having thus calculated an interference free signal, the parameter estimates are calculated again as shown in FIG. 3 and averaged with older parameter estimates for this user as described in the FIG. 3 discussion above.

What this does in a serial fashion is to update the parameters for the first signal with the current parameters for the remaining signals.

While the above has indicated a serial processing scheme, it will of course be appreciated that all of the parallel parameter tracking can in fact be done in a parallel manner, as FIG. 4 indicates. What this means is the most recent outputs of a given parameter tracking unit can be made instantly made available to all of the other parameter tracking units such that the calculations rather than waiting for the entire serial process to be completed now operate on current information on a frame by frame basis as possible.

Hence, if there are three signals on the same traffic channel, there are three processing units, one for each signal, all operating simultaneously. The output of each unit is the most current set of parameter estimates for that signal. These estimates are passed, not only to the signal separation unit, but to each of the other processing units so that the most current information is used when re-creating the training sequence portion of the received signal due to the other two signals.

What is therefore provided is a parallel processing system in which after initial parameters are provided via detection of the acquisition channel, other signals in the channel can be isolated without interruption or having to have a blank period, thus to be able to provide a parameter estimation method or unit which can satisfy the requirements of the upstream signal separation process and provide a realtime update which is accurate and robust as to the parameter values. This permits the signal separation to occur on a seamless basis.

MULTI-USER DETECTION

By way of further background, one multi-user detection, MUD, System in which the parameter estimation unit is to operate is now described.

First, in general, the optimal exhaustive search MUD that can be implemented with a Viterbi algorithm (shortest path algorithm) is exponential in complexity per bit decoded, meaning that the number of states per stage, $M^{(nK)}$, is impractically large when n, the Inter-Symbol Interference (ISI) number, times K, the number of users is greater than 12. Thus, in a practical multi-user environment n×K could easily exceed 24 such that the complexity per bit decoded is many hundreds of gigaflops or floating point operations per bit. The largest handset computational capacity is on the order of megaflops which will not support an exhaustive multi-user search signal separator like that in Verdu, Chapter 4. The multi-used detection system reduces n by tail chopping. As to K, a grouping of signals based on power reduces K into two or more sub groups, with which each subgroup containing no more than k users, and for which n×K is not excessive.

Second, all previously proposed methods to reduce complexity either require that one design new waveforms that will deviate from existing specifications for existing and upcoming wireless systems, or allow ad-hoc interference as long as the interfering waveforms comprise a linearly independent set. The requirement of linearly independent waveforms does not hold if one were to over-pack a GSM cellular timeslot in a single cell or an ACES satellite timeslot in a single spot beam, for example.

The multi-user detection system for which the subject parameter estimation unit is employed does not require the design of new waveforms and does not require the use of a linearly independent set in order to achieve over-packing for existing and proposed systems employing orthogonal signaling. Prior to this system, such a method of over-packing would require the use of the computationally impractical exhaustive search optimal MUD detailed in the Verdu text.

The exponential complexity problem has been solved by improving the theoretical insights corresponding to multi-user detection for asynchronous linearly dependent signals with intersymbol interference to eliminate this impractical complexity.

The primary reason to reduce complexity is so that real time operation is possible with state of the art processors that can be inserted into current base stations, user phones, and other transmit/receive devices that may wish to employ the subject system.

Furthermore, the user phone or small device can tolerate only small increases in complexity relative to what a base station can tolerate. The present invention involves a way to pack existing signals into the available bandwidth in such a way as to allow for a MUD procedure that is as computationally simple. The subject small device receiver algorithm is as computationally simple as a state of the art receiver and can be accomplished in real time within present state of the art processing for handsets.

In one embodiment, the system consists of the following five core pieces:

1. An asynchronous over-packing scheme for channels in the reverse link (mobile to base, or small computing device typically associated with the user to big computing device typically associated with a controller).

2. A parameter estimation block that proceeds the signal separation block.

3. A signal separation block for the controller (e.g. in the base station receiver) that outputs the channel bits to be processed by the existing system elements such as de-interleaving and error correction decoding.

4. A synchronous packing scheme for the forward link (base to mobile or big device to little device).

5. A signal separation block for the user's device (e.g. mobile telephone) that outputs the channel bits to be processed by the existing system elements such as de-interleaving and error correction decoding.

A sixth power control scheme may be used for improving the bit error rate both on the forward and reverse links.

The packing scheme for reverse link channel is very simple. The controller simply assigns one or more users to the exact same channel. Thus, in a GSM system, the base station controller would assign all empty time slots to active users. If a new user requests a time slot, the controller assigns a time slot that is already occupied.

The parameter estimation block which is improved by the subject techniques calculates estimates of each user's received power, baud timing offset, frequency offset, and oscillator phase. The controller, during acquisition with a new user, sends the received acquisition signal to the preliminary parameter estimation sub-block which computes maximum likelihood estimates for received power, baud timing offset, frequency offset, and oscillator phase. This information is then conveyed to the parameter refinement sub-block which refines the estimates of these parameters for the new user as well as the existing user or users in the shared time slot.

The signal separation block consists of an algorithm which automatically alternates between two modes of operation within the receiver. It reverts to a simple stripping procedure whenever possible when relative received signal powers are favorable to stripping. Whenever stripping is not capable of giving the required bit error rate, the receiver reverts to an inter-symbol interference (ISI) tail-chopped version of the optimum asynchronous multi-user detector. For more than two users, a hybrid between the ISI chopped optimum multi-user detection and stripping is used.

When the powers of the recovered signals are less than 6 dB apart, tail chopping is used to reduce computational complexity. The stripping procedure has the lowest complexity of all multi-user detection procedures, but suffers from bad bit error rate unless the received powers are greater than 6 dB apart in which the highest power signal dominates.

The inter-symbol interference tail-chopped exhaustive search is an improvement over the optimal exhaustive MUD detailed in the Verdu text, and achieves a substantial reduction in complexity by reducing the number of states per stage in the Viterbi decoder used for finding the maximum likelihood joint sequence. It does so by ignoring the presence of inter-symbol interference tails in the formulation of the optimum exhaustive search MUD.

For two or more users packed within the same channel, the grouped hybrid method is employed. This method groups signals into families according to their received power. In one embodiment, the lowest power signal in one family must be 6 dB higher than the highest power signal in the next lowest power family. The ISI-chopped exhaustive search MUD is performed on one family at a time, starting with the highest power family and working down in power order. After a bit stream is produced for each user in that family, the received signals are recreated using the entire signature pulse for each user in that family without the ISI tails chopped. This recreated interference signal is then subtracted from the original received signal to create an interference-reduced signal. Note, that prior to recreation of the interference signal, the bit streams may be corrected by applying the appropriate error correction if feasible. The above MUD-remod-strip procedure is repeated until all signal families are detected and/or decoded. This block requires all parameters estimated in the parameter block, along with the total number of users sharing each channel.

As to tail chopping, tail chopping merely requires providing the replica of a user's signature pulse without tails to the extensive search multi-user detector. Note that when constructing the trellis (Viterbi decoder) that performs the exhaustive search to determine the optimal set of bit streams associated with the received signal comprised of the aggregate of a number of interfering signals, one must provide a replica of each user's signature pulse, and it is this signature pulse which is provided with tails removed to the Viterbi decoder.

When one provides the complete pulse over its entire non-zero duration, which is typically more than 6 bit durations for K interfering signals, the resulting Viterbi decoder will have $M^{(Kn)}$ states per stage, where M corresponds to M-ary modulation (e.g. M=2 is binary phase shift keying), K is the number of interfering users, and n is the ISI number (e.g. the number of bit durations for which the signature pulse is non-zero).

The computational complexity required for the Viterbi decoder to search all possible paths corresponding to all possible bit combinations is proportional to the number M^(Kn) which is the number of states per stage of the trellis.

In order realize a significant reduction in computation required per bit, in the subject invention, a tail-chopped version of each user's signature pulse is provided to the exhaustive search multi-user detector. In the case where one chooses to set the pulse to zero beyond the rth bit duration, where r<n, one now has an exhaustive search via a Viterbi decoder with a reduced number of states per stage in the trellis, namely M^(Kr).

When the user signals are being received with similar powers, this tail chopping causes negligible degradation in the performance of the, now suboptimal, exhaustive search multi-user detector, but provides the desired bit streams with a significantly lower complexity.

In the case where the received signals are separated by a larger power difference, such as 6–7 dB, the error rate in the bit stream associated with the lower power user is significantly degraded by using the tail-chopped version of the exhaustive search multi-user detector.

To solve this degradation problem, the subject invention uses a power ordered stripping technique. When the power separation between highest power signal and the remaining signals is greater than 6 dB then the highest power signal is stripped off with a full tail, with lower power signals having tails chopped in the formulation of the Viterbi-decoder-based search to eliminate complexity that these tails cause in the optimal signal separation process.

Thus, in the more general case of making use of stripping to reduce the complexity consider to the case where any two power-adjacent received signals are separated by a large amount, e.g. 6 dB. In this case one reduces the complexity by stripping off the group of higher power signals, thus reducing the number, K, of interfering users expected by the exhaustive search multi-user detector. Specifically, one tells the exhaustive search multi-user detector that there are only I users, the number of users in the highest power grouping. In effect, one has decided to treat all other users as background noise. Once these users have been decoded, they are recreated with full ISI tails and stripped from the received signal to create an interference-reduced signal, e.g. an estimate of what would have been received if none of the I signals in the highest power grouping were present.

Since the other users are all much lower in received power, e.g. 6 dB lower than the lowest power user in the higher power grouping, this sub-optimal assumption causes negligible degradation to the bit error rates of the users in the high power grouping.

The benefit of tail chopping and iteratively stripping off users is that the computational complexity required is at least an order of magnitude lower since the complexity required is only on the order of M^(Ir) computations per bit decoded. This is significantly smaller than M^(Kn) since I<K and r<n.

Once the decoded bits associated with the I users in the highest power grouping have been decoded, the signals are reconstructed using the full signal with the full tails covering n bit durations and the reconstructed full signals are subtracted from the received signal. One now has an estimate of the received signal that does not include the I users in the highest power grouping. The process is then iterated, detecting and stripping off the next highest power group of signals until there are no more signals left.

In one embodiment, the power grouping is done by the parameter estimation block. The parameter estimation block must determine each user's power as part of its function. It then orders the users by power. Once ordered, the users are grouped together according to power families for which there must be a large power difference, e.g. 6 dB, between the lowest power user in one family and the highest power user in the next lower power family.

If there are only a total of two users, then the power grouping would either separate the two users in to two "groups" if there was 6 dB or greater difference between them, or group them together in one grouping if there was not.

As to the forward link, the subject synchronous packing scheme for the forward link allows for a simple signal separation procedure in the user device. Here, the subject system takes the ability to perform an orderly signal packing in the controller prior to sending the signal out to the forward channel. This is useful in that any timing or phase offsets are known by the handset prior to parameter estimation.

Note that, the separation algorithm block within the user device may be same as that in a base station.

As a further improvement a power control scheme can be implemented to control the power at the handsets to provide for groups of received signals based on power levels to permit more rapid processing by, in effect, reducing K into sub-groups of smaller k's.

The primary benefit of supersaturated communications is a significant increase in the throughput of existing cellular, PCS, and satellite multiple access communication systems, as well as systems currently being designed for future use such as next generation cellular, local wireless loop, and wireless local area networks for wireless internetworking of devices or appliances.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a multi-user detection system in which interfering signals are purposely allowed to exist, a parameter estimation unit for use in conjunction with a signal separation unit, in which each received signal has associated channel transfer functions, comprising:

a signal processor for determining said channel transfer functions for each received signal; and, means coupled to said channel transfer function determining signal processor for providing uninterrupted estimates of the channel transfer function parameters on a real-time basis by first deriving the estimated channel transfer function for each of said interfering signals.

2. The parameter estimation unit of claim 1, wherein said multi-user detection system includes a base station with a base station clock having a clock frequency offset, and wherein said channel transfer function parameters include for each received signal at least one of received power, oscillator phase of the oscillator used to produce an interfering signal, timing offset relative to the base station clock frequency offset, number of multi-path replicas and delays for each replica.

3. The parameter estimation unit of claim 1, wherein the multi-user detection system includes providing an acquisition channel, and wherein the first derived estimated channel transfer function is derived from acquisition channel parameters.

4. The parameter estimation unit of claim 1, wherein said multi-user detection system includes a tracking unit for acquired signals, and wherein in the presence of a new signal in the acquisition channel of said parameter estimation unit estimates the channel transfer function prior to signal switching from an acquisition channel to the traffic channel, with said parameter estimation unit parameters being passed to said tracking unit thereafter.

5. The parameter estimation unit of claim 1, and further including a traffic channel, and wherein for said traffic channel phase is tracked without utilization of the estimates from the acquisition channel.

6. The parameter estimation unit of claim 4, wherein all received signals have training portions, and wherein for a second interfering signal assigned to said traffic channel, said parameter estimation unit recreates the training signal portion of every received signal prior to the last received signal and subtracts the recreated training signals from the training portion of the last received signal to provide an estimate solely due to the last received signal during the training signal portion, thus to allow an estimate of the last signal from-which to calculate parameters of the last signal.

7. The parameter estimation unit of claim 1, wherein after initial estimate generation, said multi-user detection system simultaneously tracks all signals in a traffic channel.

8. The parameter estimation unit of claim 7, wherein said simultaneous tracking includes blocks for parallel recreation of the training signal portions of the traffic channel signal, each parallel processing block isolating a different signal in said traffic channel.

9. In a multi-user detection system in which interfering signals are purposely allowed to exist, a parameter estimation unit for use in conjunction with a signal separation unit for estimating channel transfer function parameters from channel transfer functions, comprising: a signal processor for determining said channel transfer functions for each received signal; and, means coupled to said channel transfer function determining signal processor for providing uninterrupted estimates of the channel transfer function parameters on a real-time basis, said multi-user detection system including a tracking unit for acquired signals, and in the presence of a new signal in an acquisition channel of said parameter estimation unit estimating the channel transfer function prior to signal switching from the acquisition channel to a traffic channel, with said parameter estimation unit parameters being passed to said tracking unit thereafter, all received signals having training portions, a second interfering signal being and assigned to said traffic channel, said parameter estimation unit recreating the training signal portion of every received signal prior to the last received signal and subtracting the recreated training signals from the training portion of the last received signal to provide an estimate solely due to the last received signal during the training signal portion, thus to allow an estimate of the last signal from which to calculate parameters of the last signal.

* * * * *